Patented Jan. 3, 1928.

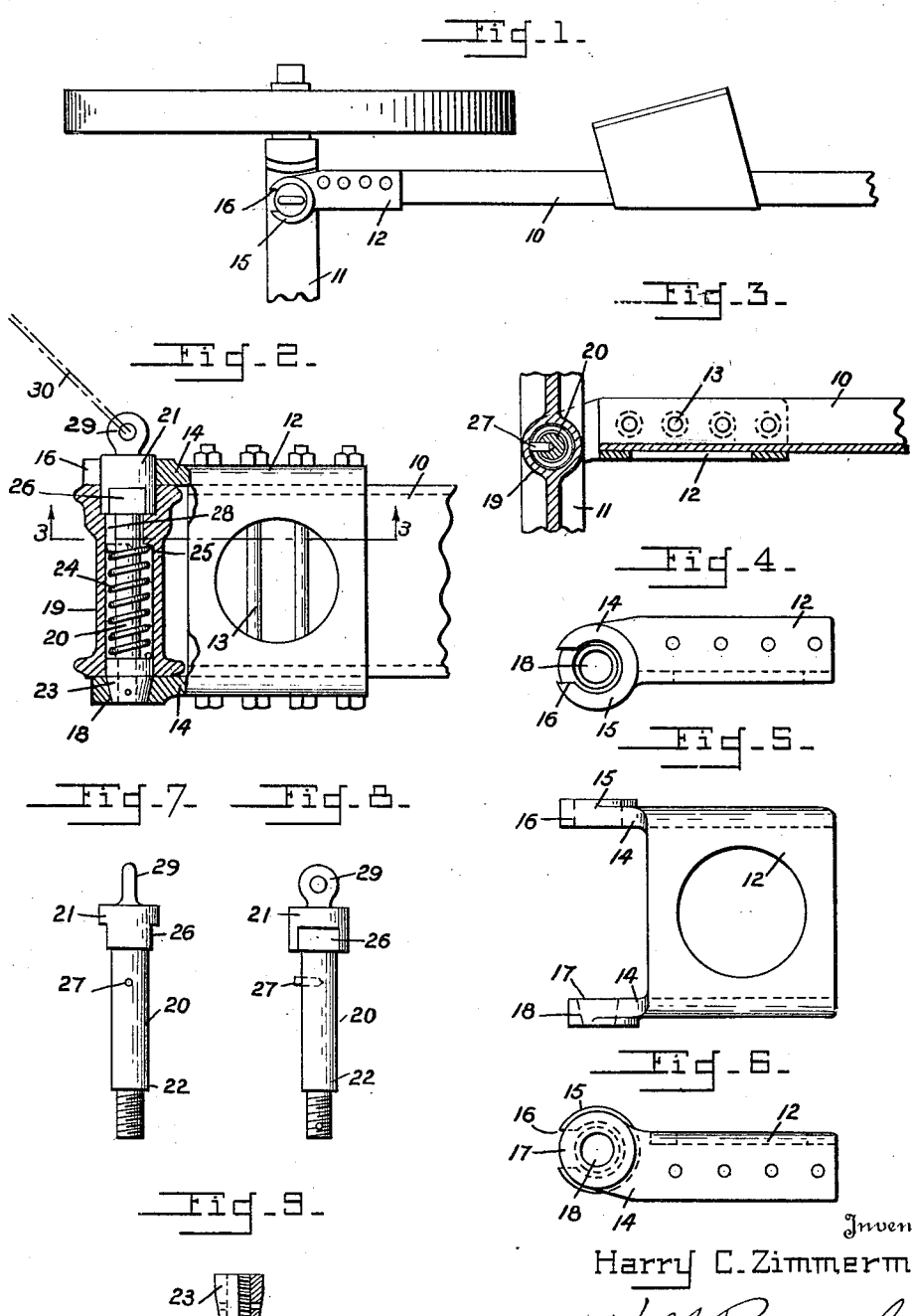

1,654,908

UNITED STATES PATENT OFFICE.

HARRY C. ZIMMERMAN, OF WASHINGTON, DISTRICT OF COLUMBIA.

TRAIL CONNECTION FOR GUN CARRIAGES.

Application filed August 25, 1924. Serial No. 734,058.

(GRANTED UNDER THE PROVISIONS OF THE ACT OF MARCH 3, 1883, 22 STAT. L., 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a trail connection for gun carriages.

In guns of small caliber which are especially designed to accompany infantry or for use in mountainous regions the various elements of the gun must be susceptible of rapid dismantling and assembling to permit of extreme mobility and maximum usefulness.

A gun of this character to be capable of strategic employment must be divisible into convenient loads so that the bearer may advance without exposing himself unduly or conveying to hostile observers the character and nature of his task.

The object of the present invention is to provide demountable trails for a gun carriage, the coupling member being retained by the axle to prevent loss and capable of locking or releasing a trail by the simple operation of being lifted.

To these and other ends, my invention consists in the construction, arrangement, and combination of elements, described hereinafter and pointed out in the claims forming a part of this specification.

A practical embodiment of my invention is illustrated in the accompanying drawings, in which, Fig. 1 is a fragmentary plan view of a gun carriage showing the position of the trail when attached to the axle;

Fig. 2 is a view of the trail connection partly in side elevation and partly in section;

Fig. 3 is a sectional view taken on the line 3—3 of Fig. 2;

Fig. 4 is a plan view of the trail connecting plate;

Fig. 5 is a view in side elevation thereof;

Fig. 6 is a bottom view;

Figs. 7 and 8 are detailed views of the bolt; and

Fig. 9 is a detailed sectional view of the stopper.

Referring to the drawings by numerals of reference:

According to the invention the opposite trails 10 of a gun carriage are each supported from the axle 11 by means of a connecting channel plate 12. The trail is preferably secured to the plate by means of bolts 13 so that in the event of breakage the plate may be readily replaced without the necessity of providing a new trail member. The sides of the channel plate 12 are formed with offset extensions 14—14 in the form of concentric annular ears, the upper ear 15 having a cut out portion 16 and the lower ear 17 formed with a conical aperture 18.

The axle 11 consists of an I beam formed with cylindrical housings 19 at either end, the housing having orifices of the same diameter as the upper and lower annular ears of the connecting plates and registering therewith when the trail is mounted to the axle.

Any suitable means for locking the trail to the axle may be employed, a preferred form consisting of a bolt 20 permanently mounted in the housing and movable to lock and unlock the connecting plate 12 to the axle.

The bolt is formed with a head 21 and a shank 22 on the extremity of which is threaded and pinned a frustro-conical stopper 23. A coil spring 24 surrounding the shank is confined between the stopper 23 and the under face of an annular partition 25 formed in the housing, the partition preventing complete withdrawal of the bolt. Inward movement of the bolt is limited by engagement of the head 21 with the upper face of the partition 25.

The head is formed with opposite recesses 26 to provide an oblong portion held at right angles to the axle by a pin 27 guided in a longitudinal slot 28 in the partition 25 so that when the bolt is raised in attaching the trail the upper ear of the plate 12 may be slid into position over the housing 19, the oblong portion of the bolt being of less width than the cut-out portion 16 of the ear. On releasing the bolt the spring 24 will force the bolt downwardly, the uninterrupted circular portion of the bolt head 21 closely fitting in the upper ear 15 and the stopper 23 entering the lower ear 17.

The bolt is provided with an eye piece 29 and a lanyard 30 so that in coupling the trail the bolt may be conveniently lifted until the stopper 23 clears the lower ring 17 and the oblong portion of the head enters the upper ear 15, said portion being held parallel to the opening in the upper ear by the pin 27 so that the trail may be readily moved to the rear until clear of the axle.

In assembling the bolt to the housing the bolt with its pin 27 is inserted from the top, the spring is inserted from the bottom, and the stopper fixed to the lower end of the shank.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A trail connection for gun carriages including a trail having forwardly extending concentric annular ears, the upper ear formed with a cut out portion, the lower ear formed with a conical aperture, an axle for supporting the trail, said axle provided with a vertical housing, an apertured partition in said housing having a longitudinal slot, a bolt mounted in the housing, said bolt formed with an enlarged cylindrical head having an oblong lower portion to permit attachment of the trail to the axle, a frustro-conical stopper secured to the other end of the bolt, a coiled spring surrounding the bolt and confined between the stopper and the partition, and a pin projecting from the bolt and disposed in the slot of the partition to maintain the oblong portion of the bolt head parallel to the trail.

2. A trail connection for gun carriages including a trail having forwardly extending concentric annular ears, the upper ear formed with a cut out portion, an axle for supporting the trail, said axle formed with a housing, an apertured partition in said housing, a bolt mounted in the housing, said bolt formed with an enlarged cylindrical head having an oblong lower portion to permit attachment of the trail to the axle, a stopper secured to the other end of the bolt, and a coil spring secured to the bolt and confined between the stopper and the partition.

3. A trail connection for gun carriages, including a trail having forwardly extending annular ears, the upper ear formed with a cut out portion, an axle for supporting the trail, said axle formed with a housing, an apertured partition in said housing, a bolt slidably mounted in the housing, said bolt formed with an enlarged cylindrical head having an oblong lower portion to permit attachment of the trail to the axle and means for normally holding the bolt in locking position.

4. A trail connection for gun carriages, including an axle, a trail having forwardly extending apertured members, the upper of said members having a cut out portion and adapted to support the trail from the axle, a locking bolt carried by the axle and mounted for limited movement in either direction, said bolt when in unlocking position adapted to permit the apertured members to be imposed on opposite sides of the axle in line with said bolt.

5. A trail connection for gun carriages including an axle, a slidable bolt permanently mounted in the axle, said bolt formed with a cylindrical head having an oblong portion, means for limiting movement of the bolt in either direction, a trail having forwardly extending supporting members, said members capable of being slid on the axle when the bolt is lifted and adapted to be irremovably engaged by the bolt when said bolt is released to normal position.

6. A trail connection for gun carriages including an axle, a slidable bolt permanently mounted in the axle, said bolt formed with a cylindrical head having an oblong portion, means for limiting movement of the bolt in either direction, a trail having forwardly extending supporting members, said members capable of being slid on the axle when the bolt is lifted and incapable of removal when the bolt is in normal position.

7. A trail connection for gun carriages embodying an axle, a trail including means for engaging the upper and lower sides of the axle, means permanently carried by the axle for locking the trail to the axle when in one position of adjustment, said means removable to another position of adjustment to enable the trail to be slid on the axle in the path of said means.

8. A trail connection for gun carriages embodying an axle, a trail including means for engaging the upper and lower sides of said axle, locking means carried by the axle and cooperating with the trail for locking the trail to the axle and mounted for limited movement in either direction, said means normally projecting above and below the axle, and adapted when moved to unlocking position to permit the trail to be slid on the axle.

9. A trail connection for gun carriages including an axle, a slidable bolt permanently mounted in the axle, means for limiting the movement of the bolt in either direction, and a trail having forwardly extending members engageable by the bolt, said members capable of being slid on the axle when the bolt is lifted and incapable of removal when the bolt is in normal position.

10. A trail connection for guns including an axle, a trail adapted to be supported by the axle, and locking means engageable with the trail permanently mounted in the axle and movable vertically therein for locking said trail to the axle, said means adapted when lifted to enable the trail to be attached or removed from the axle.

HARRY C. ZIMMERMAN.